Patented May 25, 1943

2,320,312

UNITED STATES PATENT OFFICE 2,320,312

THICKENED OIL

Robert M. Thomas, Union, and William J. Sparks, Cranford, N. J., assignors, by mesne assignments, to Jasco, Incorporated, a corporation of Louisiana No Drawing. Application January 4, 1938, Serial No. 183,286

4 Claims. (Cl. 252—48)

The present invention relates to oils of improved viscosity and viscosity index characteristics and methods of making same, and it relates more particularly to adding to an oil base stock a sulfurized derivative of a high molecular weight plastic and/or elastic solid substantially saturated linear aliphatic compounds.

The invention may be illustrated by adding to a mineral lubricating oil base stock about 5% of a product obtained by treating an isobutylene polymer of about 15,000 molecular weight (as determined by Staudinger's viscosity method) with a 20% solution of sulfur mono-chloride in di-chlor benzene at 160° C. for about one-half hour; the resulting oil composition has substantially higher viscosity and better viscosity index characteristics and lubricating properties than the lubricating oil base stock. The invention will be described more in detail further on.

Although the preparation of the polymer itself is not per se a part of the present invention, it will be described briefly in order that the invention may be better understood. The process will be described as particularly applied to the polymerization of isobutylene although other iso-olefins, such as 2-methyl butene-1, having a similar chemical structure and capable of polymerizing to a very high molecular weight linear type hydrocarbon polymer with short alkyl side chains, may also be used. Isobutylene is polymerized in the presence of a volatile inorganic halide, particularly boron fluoride at temperatures below −10° C. such as about −50° C. or even as low as −100° C. The reaction is preferably carried out in the presence of a suitable solvent for the isobutylene such as some of the liquefied normally gaseous hydrocarbons, for instance, propane, ethylene, etc., which serve simultaneously as refrigerant by boiling and absorbing latent heat of evaporation. The resulting polymer generally precipitates out from the solvent-refrigerant and is recovered after evaporation of the latter, letting it warm up to room temperature and then washing with water or dilute caustic soda or otherwise purifying to remove any residual catalyst; it is desirable that the product contain less than 0.1% and preferably not more than .01% of inorganic salt.

The polymerized product is a substantially colorless, plastic solid which may have an average molecular weight from about 1,000 up to 200,000 or more, depending upon whether the conditions are regulated so as to produce a polymer having an average molecular weight of about 15,000 as representing the lower range, or about 80,000 as a medium molecular weight or about 150,000 as representing the extremely high molecular weight polymers. In preparing the extremely high molecular weight polymer, the starting materials should be free from other low molecular weight olefins, sulfur compounds, and other substances which act as poisons to the polymerization of isobutylene, and the temperature should be below about −50° C., but for making polymers having an average molecular weight of between about 1,000 and 50,000, either substantially pure materials may be used at a temperature between about −10° C. and −50° C., or slightly less pure materials may be used at lower temperatures.

If desired, the polymerized product may be separated into fractions for different molecular weights, either by selective extraction or solution and precipitation, using solvents such as ethane, propane, naphtha, benzene, acetonbenzine, etc. at the proper temperature to make the desired separation. In this way the polymers having any particular desired molecular weight range may be separated from those having higher or lower molecular weights.

Although it is preferred to use boron fluoride as the polymerization catalyst, one may also use dry aluminum chloride, titanium tetrachloride, ferric chloride, etc., or other inorganic halides, although these do not give as good results as the boron fluoride.

Although the above described iso-olefin polymers are preferred as starting material, one may also use hydro-rubber (made by hydrogenation of natural or synthetic diolefin rubber and the like) having somewhat similar properties.

These plastic solid substantially saturated linear aliphatic polymers, which generally have an iodine number below 30 mg./g. and usually below 10, have the important property of very greatly increasing the viscosity of liquids in which they are dissolved, the increase in viscosity being directly proportionate to the molecular weight of the polymer and to the amount of the polymer used.

One object of the present invention is to effect still further improvements in the valuable properties of these thickening agents. It has been found that when isobutylene polymers of approximately 1,000 to 50,000 molecular weight, preferably about 1,000 to 25,000 molecular weight, and preferably even below 15,000 molecular weight and having an iodine number of about 1 to 10, are treated with sulfur chloride in the presence of an inert solvent at an elevated temperature for the required length of time, the polymer is converted into a product having substantially improved thickening power and superior viscosity index characteristics. This sulfuried product also has greater stability to heat and to "breakdown" action of gears operating under load, and to ultra-violet light than the untreated polymer; and may be used in solution in mineral oil base stocks of various kinds, e. g. lubricating oils, greases, and even lighter oils such as gas oils used as Diesel fuels, or gasoline for motor fuel or cleaning purposes. It may also be used in fatty oils, e. g. paint, varnish and lacquer oil vehicles, e. g. linseed oil, etc.

In carrying out the sulfurization, the amount of the aliphatic polymer to be used may vary over a fairly broad range depending upon the molecular weight of the polymer and the amount of solvent used, and accordingly, upon the viscosity of the resultant solution of the polymer in the solvent, but generally the amount of polymer should be between the approximate limits of 0.1 to 2.0 parts, and preferably 0.2 to 1.0 parts by weight for every 1 part of solvent. Carbon tetrachloride, dichlorbenzene and the like may serve as solvents. The temperature should be between the approximate limits of 80 and 200° C., and preferably between 100 and 175° C. It is preferred to use sulfur mono-chloride as the sulfurizing agent and it is preferred to use about 5-50% of the sulfur chloride in relation to the weight of the solvent solution used, or ½-2 parts by weight for each 1 part of polymer.

In carrying out the sulfurization process care must be taken not to let the reaction proceed too far because upon continued reaction an oil-insoluble product is formed. In other words, the reaction must be stopped while the sulfurized polymer is still soluble in the type of oil with which it is to be admixed for use; this varies somewhat according to the chemical nature and viscosity of the oil but can readily be determined by testing a small sample of the reaction product at various stages of the reaction. The time of heating will depend upon the temperature and amount of sulfur chloride and may be 5 or 10 minutes or as much as 50 or 100 hours.

The amount of thickener to be used for thickening purposes will depend largely upon the viscosity of the oil base stock used and the thickening power of the sulfurized polymer as well as upon the viscosity desired in the finished product but will ordinarily range between the approximate limits of 0.5 and 30%, usually 1-10% giving satisfactory improvement in viscosity and viscosity index, especially for lubricating oil and grease manufacture.

The effect of a sulfurized iso-olefin polymer on the viscosity and viscosity index characteristics of a mineral lubricating oil base stock is shown in the following table where, for the sake of comparison, the corresponding results obtained with the unsulfurized polymer are also shown. The term viscosity index is used to denote the relationship of viscosity to temperature as has been described in an article entitled, "Viscosity Variations of Oils with Temperature" by E. W. Dean and G. H. B. Davis in Chem. and Met., Volume 36, pages 1618-9 (October, 1929).

| Sample | Saybolt viscosity— | | Viscosity index |
|---|---|---|---|
| | at 100° F. | at 210° F. | |
| Coastal lubricating oil | 210 | 43.5 | 0 |
| Coastal oil+1.8% isobutylene polymer [1] | 380 | 58.0 | 103 |
| Coastal oil+1.8% sulfurized isobutylene polymer [2] | 570 | 70.6 | 108 |

[1] M. W. about 14,000.
[2] M. W. approximately 20,000.

The sulfurized polymer used was made by dissolving in 150 parts by weight of ortho-dichlor benzene 50 parts by weight of isobutylene polymer having a molecular weight of about 14,000 and heating the solution to about 160° C. under an air condenser. 50 parts of sulfur mono-chloride ($S_2Cl_2$) were added to the solution and the heating continued at 160° C. for 25 minutes. The reaction product was recovered by dilution with an equal amount of benzene and precipitated by addition of alcohol. The precipitated product was then dissolved in benzene and filtered through a powdered mixture of sand and caustic soda (to remove any free sulfur). After drying, part of the product was used for making the above described viscosity and V. I. improvement test and another part of the product was used for determining its molecular weight and a third part was subjected to chemical analysis, the results of which were:

| | Per cent |
|---|---|
| Carbon | 83.98 |
| Hydrogen | 14.17 |
| Chlorine | 0.85 |
| Sulfur | 0.65 |
| | 99.65 |

This sulfurized product was found to be much more stable than the original unsulfurized polymer in respect to heat, light and chlorine and makes a more stable oil solution in the presence of loaded gears than does the unsulfurized polymer.

It is apparent from the above table that the sulfurized isobutylene polymer has a very much greater thickening power and even a slightly superior viscosity index than the same isobutylene polymer before the sulfurization treatment.

The mechanism of the operation of the present invention is not well understood because, as stated previously, the isobutylene polymer itself before sulfurization is substantially completely saturated with respect to hydrogen and has only one terminal double bond or olefinic linkage in a tremendously large molecule so that this polymer is different from substantially unsaturated materials such as diolefins or diolefin polymers or rubber or various unsaturated fatty oils of the drying oil type. The exact chemical reactions which take place during the sulfurization are not known to a certainty but chemical analyses indicate that the sulfurized product contains both a small amount of sulfur and a small amount of chlorine from the sulfur mono-chloride. In one example where the reaction had proceeded only slightly further than in the sulfurized isobutylene polymer shown in the above table, the treated polymer contained about 1.3% sulfur and about 1.5% chlorine. In spite of these low sulfur and chlorine contents, however, a substantial excess of sulfur mono-chloride ($S_2Cl_2$) in relation to the amount of polymer treated is generally required to produce the desired sulfurization reaction.

The sulfurized product also exhibits extreme pressure properties, making it suitable as a base for the preparation of extreme pressure lubricating oils and greases. It may also be used in conjunction with other thickeners, oiliness agents, dyes, anti-oxidants, soaps, pour inhibitors, sludge dispersers, and the like.

It is not intended that the invention be limited by any of the specific examples given herein above or by any theories of the operation of the invention but only by the appended claims in which it is intended to claim all novelty inherent in the invention as broadly as the prior art permits.

We claim:

1. A thickened mineral oil composition having high stability against breakdown, comprising a mineral oil base stock substantially thickened by the product obtained by the reaction of one part of an iso-olefin polymer of 1,000 to about 50,000 molecular weight with from about ½ to 2 parts by weight of sulfur chloride at a temperature in the range between 100° C. and about 200° C. until said polymer is converted into a product of considerably higher molecular weight containing less than about 1.3% of chemically combined sulfur and less than about 1.5% chemically combined chlorine.

2. A lubricating oil composition comprising essentially a mineral lubricating oil base stock of relatively low viscosity and viscosity index characteristics blended with about 0.5 to 20% of a thickener consisting of the product obtained by the reaction of one part of a plastic isobutylene polymer of 1,000 to about 50,000 molecular weight with from about ½ to 2 parts by weight of sulfur mono-chloride at a temperature in the range between 100° C. and 175° C. until the polymer is converted into a product of considerably higher molecular weight containing about 0.65% to 1.3% of chemically combined sulfur and about 0.85% to 1.5% of chemically combined chlorine.

3. A lubricating oil composition comprising a mineral lubricating oil base stock of relatively lower viscosity mixed with about 1 to 10% of the product formed by reacting one part of isobutylene polymer having a molecular weight in the range of 1,000 to 50,000 with from about ½ to 2 parts by weight of sulfur mono-chloride in the presence of an inert solvent at a temperature between 100° C. and 175° C. until the product formed has a molecular weight considerably higher than the polymer and contains about 0.65% to 1.3% of chemically combined sulfur and about 0.85% to 1.5% of chemically combined chlorine.

4. A lubricating oil comprising a mineral lubricating oil base stock of relatively lower viscosity blended with about 1.8% of the thickening product formed by reacting an isobutylene polymer having molecular weight of about 14,000 with an equal weight of sulfur mono-chloride at a temperature of about 160° C. until the product formed has a molecular weight of approximately 29,000 and contains about 0.85% of chlorine and 0.65% of sulfur.

ROBERT M. THOMAS.
WILLIAM J. SPARKS.